United States Patent [19]

Borrelli et al.

[11] Patent Number: 5,449,645

[45] Date of Patent: Sep. 12, 1995

[54] GLASSES WITH PBS AND/OR PBSE CRYSTALS

[75] Inventors: Nicholas F. Borrelli, Elmira; George B. Hares; Dennis W. Smith, both of Corning, all of N.Y.

[73] Assignee: Corning Incorporated, Corning, N.Y.

[21] Appl. No.: 296,450

[22] Filed: Aug. 26, 1994

[51] Int. Cl.$^6$ ............................................. C03C 10/02
[52] U.S. Cl. ......................................... 501/10; 501/32; 501/60; 501/62; 65/33.1
[58] Field of Search .................. 501/10, 32, 57, 60, 501/62; 65/33.1, 33.9

[56] References Cited

U.S. PATENT DOCUMENTS

| | | | |
|---|---|---|---|
| 5,091,115 | 2/1992 | Nogami | 501/32 X |
| 5,093,286 | 3/1992 | Nogami | 501/32 X |
| 5,292,801 | 3/1994 | Avnir et al. | 501/32 X |
| 5,300,564 | 4/1994 | Avnir et al. | 501/32 X |

OTHER PUBLICATIONS

A. L. Efros et al., "Interband Absorption of Light in a Semiconductor Sphere" Sov. Phys.–Semicond. 16, 772 (1992).

M. Nogami et al., "Preperation of Small–Particle Size, Semiconductor Cds Doped Silica Glasses by the Sol–Gel Process" J. Am. Cer. Soc., 73, 2097 (1990).

M. Nogami et al., "Cds Microcrystal–Doped Silica Glass Prepared by the Sol–Gel Process" J. Non–Cryst. Sol. 122, 101 (1990).

R. Klann et al., "Picosecond Optical Nonlinerities in Lead Chalcogenide Semiconductors" Appl. Phys. Lett., 59, (8), 885 (1991).

*Primary Examiner*—Karl Group
*Attorney, Agent, or Firm*—Clinton S. Janes

[57] ABSTRACT

This invention is directed to the production of glass bodies containing crystallites of PbS and/or PbSe. The crystallite-containing bodies are formed by the thermal crystallization in situ of glass bodies having compositions essentially free from CdO and consisting essentially, expressed in terms of weight percent on the oxide basis except for fluorine, sulfur, and selenium which are expressed in terms of weight percent on the elemental basis, of

| | | | |
|---|---|---|---|
| $SiO_2$ | 58–65 | RO | 0–15 |
| $Na_2O$ | 10–15 | F | 1–3.5 |
| ZnO | 5–17 | S | 0–3 |
| $Al_2O_3$ | 0.5–5 | Se | 0–3 |
| PbO | 3–6 | S + Se | 1–3 | wherein RO consists of at least one alkaline earth metal oxide in the indicated proportions selected from the group consisting of 0–5% BeO, 0–5% MgO, 0–15% CaO, 0–10% SrO, and 0–10% BaO.

6 Claims, 2 Drawing Sheets

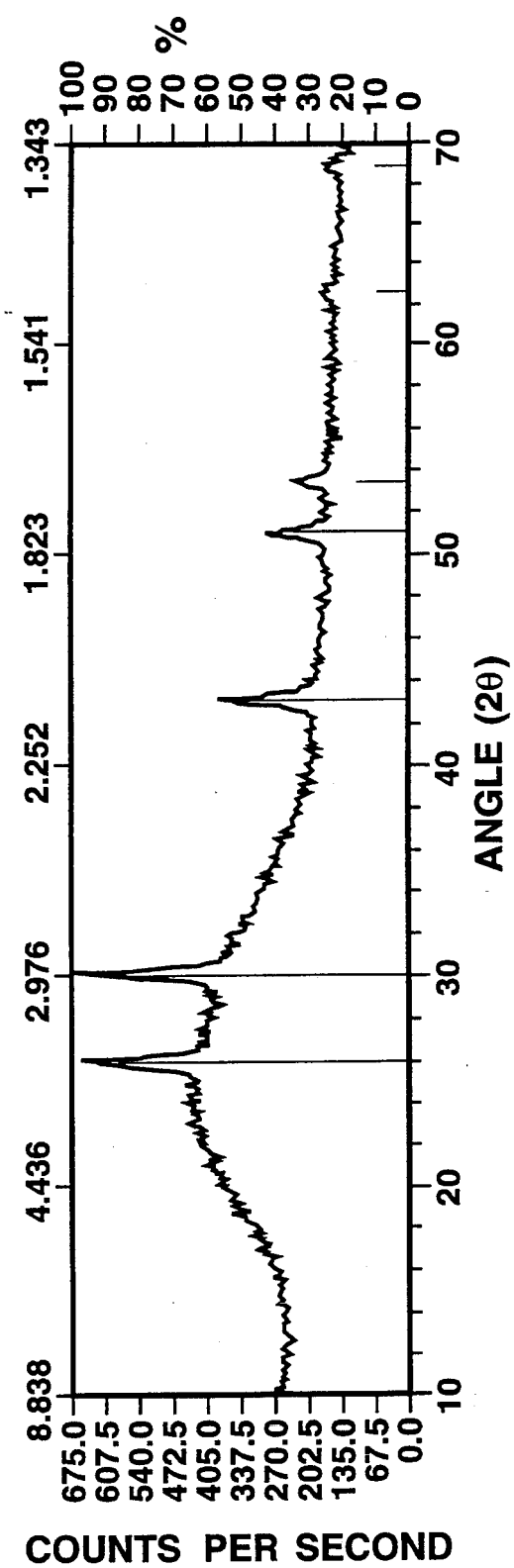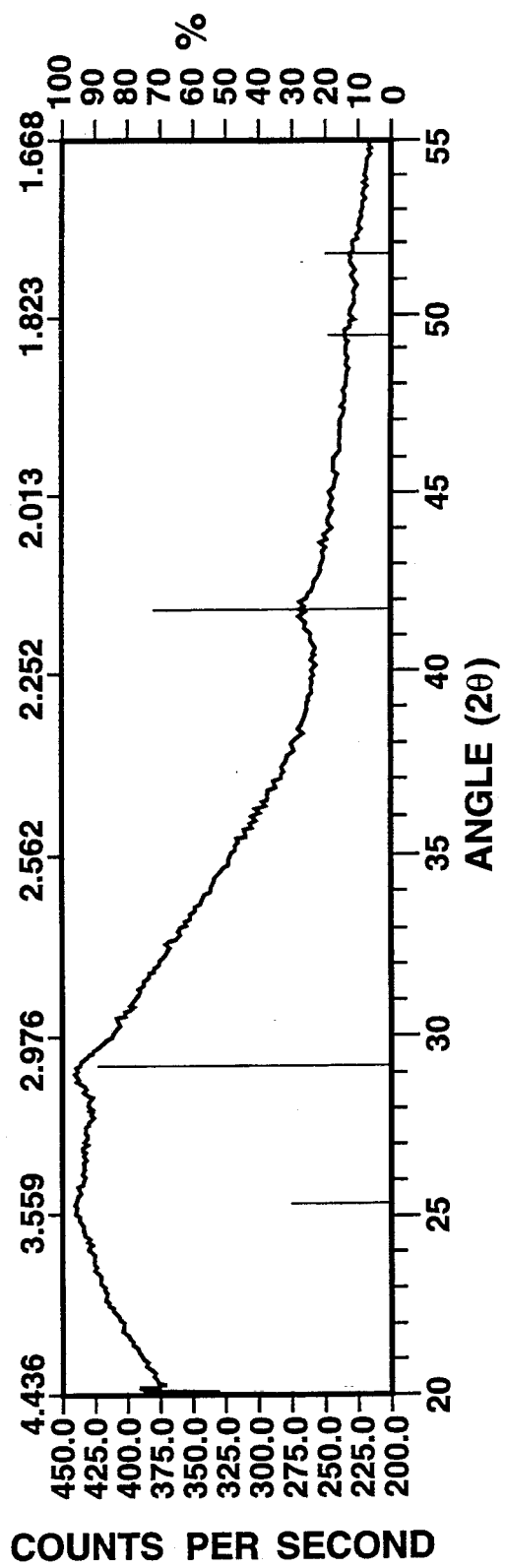
FIG. 1
FIG. 2

GLASSES WITH PBS AND/OR PBSE CRYSTALS

FIELD OF THE INVENTION

The present invention is directed to glass articles containing microcrystals of lead sulfide (PbS) and/or lead selenide (PbSe), thereby rendering such articles useful in the fabrication of nonlinear optical devices.

BACKGROUND OF THE INVENTION

The interest in structures having dimensions sufficiently small to lead to quantum confinement effects has continued unabated since the initial demonstration of one-dimensional quantum wells in GaAs. The ability to extend the confinement to three dimensions in the form of quantum dots of CdS, CdSe, and CdTe in glasses has sparked further research activity. Among the methods for the preparation of quantum dots reported in the literature have been the formation and deposition in porous glasses, the chemical preparation and subsequent suspensions in an organic or polymer matrix, and sol-gel based methods. The advantage one method may have over another is in its ability to produce a narrower particle size distribution and/or a more defect-free crystallite phase. The latter condition is difficult to produce because, for the above-mentioned materials at the size required for confinement (as explained hereinafter), the surface contribution of the crystallite, whether it be density of states or defects, compares favorably to the volume contribution. The idealized theoretical treatments cannot take into account the surface effects. That circumstance suggests the extension of the quantum dot development in glass to materials which have significantly smaller effective masses so that quantum confinement would be achieved at larger crystallite sizes and, hence, minimize surface contributions.

The crystal compositions that have been prepared via one or more of the above-mentioned methods have involved the following crystal systems: (1) materials from the I and VII group of the Periodic Table such as CuCl and CuBr; (2) materials from the II and VI groups of the Periodic Table such as CdS, ZnS, and CdSe; and (3) materials from the IV and VI groups of the Periodic Table such as PbS and PbSe.

A. L. Efros et al., Sov. Phys.—Semicond. 16, 772 (1992), appear to be the first to classify the confinement with respect to the electron and hole Bohr radii, $a_e = \hbar^2 \varepsilon / m_2 2^2$ and $a_h = \hbar^2 e / m_h 2^2$, respectively, as compared to the crystallite radius a. In those two expressions $\varepsilon$ is the optical dielectric constant, e is the electronic charge, $\hbar$ is Planck's constant, and m is the respective effective mass of the electron and the hole. The classification is illustrated in Table I below, along with the theoretical energy shift and the most likely materials that satisfy the confinement criteria. In the strong and intermediate confinement cases, the experimental effect observed is a blue shift of the fundamental absorption edge accompanied by the onset of absorption bands corresponding to the discrete energy states produced by the confinement. The resolution or sharpness of these bands depends upon the narrowness of the particle size distribution and the inherent homogeneous line width. For the weak confinement case the experimental result is a shift in the energy of the exciton. This action can be viewed as the effect of the confinement of the exciton itself. In the strong and intermediate confinement cases the quasi-particle is the electron and the hole, whereas in the weak confinement case it is the exciton.

TABLE I

| Confinement | Crystallite Size | Energy* Shift | Possible Example |
|---|---|---|---|
| Strong | $a < a_e, a_h$ | $\hbar^2/2a^2\mu$ | PbS $a_2 = a_h = 9$ nm |
| Intermediate | $a_2 < a < a_h$ | $\hbar^2/2a^2 m_e$ | CdSe $a_e = 3$ nm, $a_h = 0.5$ nm |
| Weak | $a > a_e, a_h$ | $\hbar^2/2a^2 M$ | CuCl $a_e, a_h = 0.5$ nm | wherein $1/\mu = 1/m_e + 1/m_h$ and $M = m_e + m_h$.

*Calculated as a particle in an infinite spherical well with the coulombic interaction ignored in accordance with M. Nogami et al., J. Am. Cer. Soc., 73, 2097 (1990).

Both the intermediate and weak cases have been observed in glass with the controlled crystallization of such microcrystalline phases as CuCl and CuBr in the former case [M. Nogami et al., J. Non-Cryst. Sol. 122, 101 (1990)], and CdS and CdSe in the latter [R. Klann et al., Appl. Phys. Lett., 59, (8), 885 (1991)].

To the knowledge of the present applicants there has been no report of the crystallization of PbS or PbSe directly from glass, although they have been prepared through chemical reactions in polymers, in porous glass, and in organic glasses. Each of those studies has demonstrated the occurrence of significant shifts in absorption edge, thereby indicating particle diameters on the order of 2–20 nm. The adsorption spectra, however, did not illustrate well-resolved, discrete adsorption peaks, as had been observed in the CdS and CdSe systems. That inspection of the adsorption spectra led to the conclusion that the particle size distribution was broad. We conjectured that, perhaps, by thermally developing in situ a PbS or PbSe crystal phase in a glass, a narrower particle size distribution could be obtained. In addition, there would be advantages in having the PbS or PbSe crystallites in an inorganic glass from the standpoint of having the crystalline phase in an inert, hermetic, and high temperature matrix.

Therefore, the principal objective of the present invention was to produce glass articles containing microcrystals of PbS and/or PbSe crystallized in situ therein.

A necessary companion objective was to devise a method for making such crystal-containing, glass articles.

A specific objective was to produce glass articles containing microcrystals of PbS and/or PbSe wherein the crystal dimensions are relatively uniform in size.

SUMMARY OF THE INVENTION

Those objectives can be secured in glass compositions disclosed in U.S. Pat. No. 2,503,140 (Stookey). Thus, the family of glasses disclosed in that patent comprises excellent precursor compositions for the thermal development in situ of PbS and PbSe crystals. As described in that patent, the glasses recorded therein were utilized as the white background provided for the mercury in glass thermometer tubing. This white background, termed the "white stripe", is produced through the formation of zinc sulfide (ZnS) crystals at temperatures in the vicinity of 900° C. concurrently with the forming of the capillary.

As is explained in the patent, those glass compositions are of the type recognized as "reheat opals". That is, the batches for such glasses are melted and the melts cooled to glass bodies sufficiently rapidly to avoid the generation of devitrification therein. Subsequently, the glass bodies are remelted at a predetermined temperature below the liquidus temperature of the glass to precipitate crystals therein, the crystals developed in the glasses of U.S. Pat. No. 2,503,140 being ZnS.

The glass compositions described in the patent were termed "alkali-zinc-silicate" glasses, those glasses being prepared through the fusion of glass forming batches containing a major proportion of silica, a minor proportion of an alkali metal oxide such as sodium oxide ($Na_2O$), and a minor proportion of zinc oxide (ZnO). The preferred glass compositions additionally contained a minor proportion of alumina ($Al_2O_3$). Optional ingredients included minor proportions of fluoride (F), boric oxide ($B_2O_3$), and another divalent metal oxide than cadmium (CdO) selected from Groups IIa and IIb of the Periodic Table such as beryllium oxide (BeO), magnesium oxide (MgO), calcium oxide (CaO), strontium oxide (SrO), and barium oxide (BaO). The glass compositions expressly contained 5-20% by weight ZnO and 0.5-2% by weight sulfur (S).

We have found that by replacing about 3-6% by weight of the ZnO content in the base glass compositions disclosed in U.S. Pat. No. 2,503,140 with PbO and reheating the glass body cooled from the molten glass to a temperature not exceeding about 650° C., crystallites of PbS of relatively uniform dimensions can be developed in situ. And, by substituting selenium (Se) for sulfur in the base compositions of U.S. Pat. No. 2,503,140 and reheating the glass body to a temperature also not exceeding about 650° C., crystallites of PbSe of relatively uniform dimensions can be developed in situ. These crystalization temperatures are far below those demanded to develop ZnS crystals. Because cadmium (Cd) readily bonds with sulfur and selenium, the inventive glass compositions will be essentially free from cadmium oxide (CdO). By "essentially free from" is meant that no more than impurity amounts will be present.

We have found that compositions operable in the invention will be essentially free from CdO and will consist essentially, expressed in terms of weight percent on the oxide basis except for fluorine, sulfur, and selenium which are expressed in terms of weight percent on the elemental basis, of

| $SiO_2$ | 58-65 | RO | 0-15 |
|---|---|---|---|
| $Na_2O$ | 10-15 | F | 1-3.5 |
| ZnO | 5-17 | S | 0-3 |
| $Al_2O_3$ | 0.5-5 | Se | 0-3 |
| PbO | 3-6 | S + Se | 1-3 | wherein RO consists of at least one metal oxide in the indicated proportions selected from the group consisting of 0-5% BeO, 0-5% MgO, 0-15% CaO, 0-10% SrO, and 0-10% BaO.

The method for preparing the inventive glasses comprises the following steps:
(a) a glass forming batch for a glass having a composition coming within the above-recited ranges is melted;
(b) that melt is cooled and simultaneously shaped into a glass body of a desired geometry; and
(c) that glass body is heated to a temperature for a time sufficient to develop PbS and/or PbSe crystallites therein.

For the development of crystallites, the glass body will be reheated to temperatures within the range of 550°-650° C. It is well recognized that crystal growth takes place more rapidly as the temperature is raised. Therefore, in order to generate crystallites of controlled diameters in the desired range of about 7-30 nm, heat treatments of a few hours, e.g., 1-4 hours, may be required at the cooler extreme of the temperature range, whereas but a few minutes may be adequate at the hotter extreme of the temperature range. To assure the most uniformly-sized crystallites, a two-step heat treatment is preferred wherein the body is initially heated to a temperature at or somewhat below the cooler extreme of the crystallization range, and thereafter the temperature is raised within the crystallization range. It is believed that the initial heat treatment develops nuclei in the glass upon which the crystallites grow. To illustrate, in the glasses wherein crystallites are generated, the initial heat treatment will be conducted within the temperature interval of about 450°-550° C.

BRIEF DESCRIPTION OF THE DRAWINGS

FIGS. 1 and 2 comprise x-ray diffraction patterns exhibited by thermally treated glasses.

DESCRIPTION OF PREFERRED EMBODIMENT

To illustrate the invention, the two glass compositions recited below in Table I represent the most preferred PbS-containing and most preferred PbSe-containing glass. The compositions are reported in terms of parts by weight on the oxide basis, except for the F, S, and Se contents which are recorded on an elemental basis, because it is not known whether each is totally combined with a single cation. Inasmuch as the sum of the components closely approximates 100, for all practical purposes the individual values tabulated may be deemed to reflect weight percent. The actual batch ingredients can be oxides or other materials which, when melted together with the other constituents, will be converted to the desired oxide in proper proportions. In the laboratory glasses described herein, fluorine was incorporated as the compound $Na_2SiF_6$, and the sulfur and selenium were incorporated in elemental form. The batch ingredients were compounded, thoroughly mixed together to assist in securing a homogeneous melt, and charged into fused silica crucibles. The crucibles were introduced into a furnace operating at 1350° C., the batches were melted for three hours, the melts were poured into steel molds to produce glass slabs having the dimensions 10"×4"×0.5" (25.4×10.2×1.3 cm), and those slabs were transferred immediately to an annealer operating at 450° C. Samples having dimensions of 1"×1" (2.54×2.54 cm) were cut from the annealed slabs and then ground and polished to a thickness of about 0.25 mm for optical measurements.

Table I also records the softening point (S.P.), the annealing point (A.P.), and the strain point (St.P) of Glass A in terms of °C., and the density (Dens.) in terms of g/cm$^3$.

TABLE II

|  | 1 | 2 |
|---|---|---|
| $SiO_2$ | 59.1 | 59.1 |
| $Al_2O_3$ | 4.16 | 4.16 |
| $Na_2O$ | 14.6 | 14.6 |
| ZnO | 14.8 | 14.8 |
| PbO | 3.87 | 3.87 |
| F | 1.93 | 1.93 |
| S | 1.45 | — |
| Se | — | 1.45 |

TABLE II-continued

|   | 1 | 2 |
|---|---|---|
| S.P. | 660 | |
| A.P. | 480 | |
| St.P. | 445 | |
| Dens. | 2.64 | |

FIG. 1 comprises the x-ray diffraction patterns exhibited by Glass 1 after a sample thereof had been heat treated at 575° C. for 0.5 hour followed by 625° C. for 0.5 hours. This pattern and those described below were generated with a Scintag XDS-2000 unit. The agreement of the peaks in the diffraction pattern with lines for crystalline PbS is shown. From the line broadening observed of the first two scattering peaks, it was possible to estimate the average crystal particle size as a function of thermal treatment utilizing a program available with the x-ray instrument. The results are reported in Table II below.

A similar experiment was conducted on Glass 2 wherein Se was substituted for S to confirm the presence of PbSe. This pattern is depicted in FIG. 2. The obviously weaker diffraction pattern for the PbSe phase is attributed to the smaller crystal content because of a lower concentration of PbSe.

Figure 3:
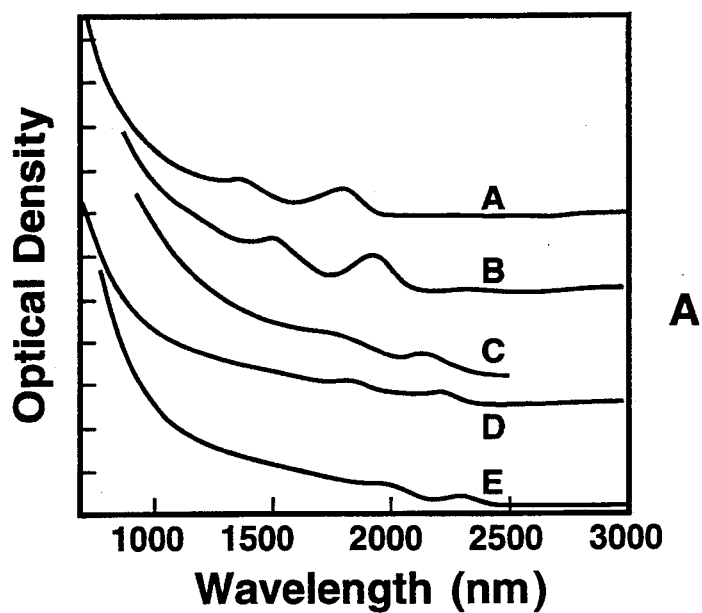
FIGS. 3 and 4 comprise optical absorption spectra exhibited by thermally treated glasses.
Figure 4:
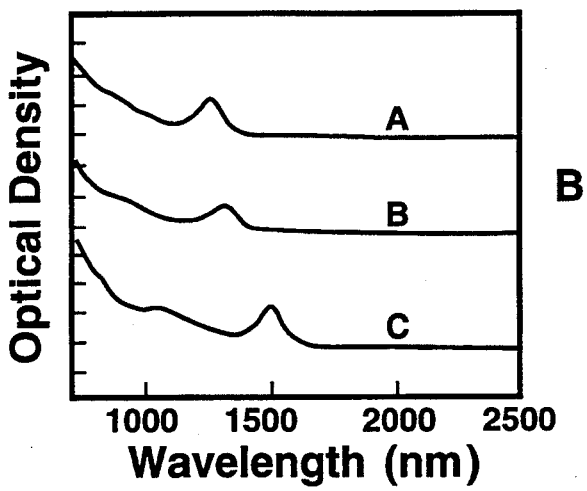

The optical absorption spectra of PbS-containing glass samples thermally treated via a number of different schedules are illustrated in FIGS. 3 and 4, those schedules being recorded in Table III. The sub-banding of the absorption near the edge, and the dependence of the spectral position of the particular sub-bands with thermal development, are indicative of quantum confinement. In general, smaller particle sizes were obtained utilizing a prolonged low temperature nucleation treatment, followed by a short higher temperature heat treatment to promote crystal growth on the nuclei. That action is confirmed in Table III where the occurrence of larger energy shifts with lower nucleation treatments is recorded.

Quantum confinement effects can be clearly seen in the absorption spectra depicted in FIGS. 3 and 4. The distinct sub-banding and the spectral shift with different thermal developments strongly suggests the crystal size-dependent confinement phenomenon.

Figure 5:
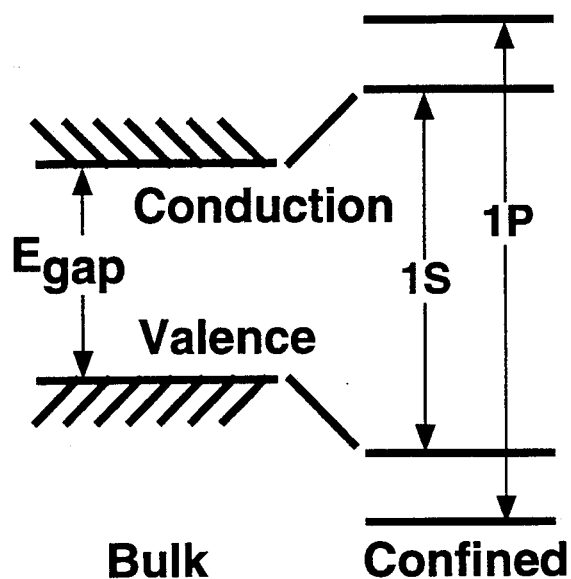
FIG. 5 comprises a quantum confined energy diagram.

The energy shifts can be defined with the help of the strong quantum confined energy diagram set out in FIG. 5. The first three peaks in the absorption curve were taken to correspond to the IS-IS, IS-IP, and IP-IP transitions. We assumed that the energy splitting was the same for the electron and hole states because they have the same effective mass. The energy shift corresponding to the IS-IS transition was taken to be the difference in energy of the lowest energy peak in the absorption spectrum and the bulk band gap of 0.4 eV, and similarly for the second and third peaks, IS-IP and IP-IP. The energy shifts measured in this way for the samples with various heat treatments are listed in Table II.

No quantitative estimate of the particle size distributions obtained in the samples after their exposure to the various thermal development schedules was made. The FWHM (full width at half maximum) of the IS-IS sub-band was measured to be somewhat smaller than that determined in a prior study of CdSe. This width represents the convolution of the homogeneous line width and the particle size distribution. It is conjectured that the measured line width is smaller in the PbS samples because of a smaller homogeneous width therein.

The prior work reporting the production of PbS in porous glass and in a sol-gel showed no resolved sub-banding, but did demonstrate large adsorption edge shifts. It is believed that the lack of defined sub-banded peaks may have resulted from the production of such smaller average crystallite size and the attendant increased broadening as a consequence of the particle size distribution. The fact that the energy shift is inversely proportional to the square of the particle radius makes the breadth of the energy sub-bands significantly wider for smaller particles for a given distribution. Our invention process of crystallizing a glass body in situ provides a better controlled method to prepare quantum confined PbS and PbSe particles of homogeneous width.

Table III reports the energy shift observed when various heat treatments were applied to Glass 1. The treatments are expressed in terms of °C. for a period in hours. The average particle size is recorded in nm. The energy shift ΔE and the full width at half maximum FWHM are expressed in electron volts ev.

TABLE III

| Sample | Heat Treatment | Particle Size[2] | ΔE[1] | FWHM[1] | ΔE[2] | ΔE[3] |
|---|---|---|---|---|---|---|
| A | 500° for 16 hours + 550° for 0.5 hour | 7.6 | 0.29 | 0.08 | 0.49 | 0.80 |
| B | 500° for 16 hours + 550° for 1.5 hours | 8.0 | 0.24 | 0.06 | 0.43 | 0.73 |
| C | 500° for 16 hours + 600° for 0.5 hour | 12.6 | 0.17 | — | 0.29 | — |
| D | 550° for 3 hours | 9.6[3] | 0.15 | — | 0.27 | 0.46 |
| E | 550° for 5 hours | 13.3 | 0.12 | — | 0.22 | 0.34 |
| Lower Nucleation Temperature: | | | | | | |
| F | 450° for 16 hours + 500° for 1 hour + 525° for 1 hour | — | 0.58 | 0.08 | 0.99 | — |
| G | 450° for 16 hours + 515° for 1 hour + 525° for 1 hour | — | 0.54 | — | 0.95 | — |
| H | 450° for 16 hours + 535° for 1 hour | — | 0.43 | — | 0.76 | — |
| I | 450° for 87 hours + 525° for 1 hour | — | 0.65 | 0.10 | — | — |

[1]Based on an energy gap of 0.4 ev for bulk PbS
[2]Estimated from breadth of x-ray lines
[3]Very weak intensity Curves A–E in FIG. 3 reflect spectra corresponding to Samples A–E of Table III and curves F–H in FIG. 4 reflect spectra corresponding to Samples F–H of Table III.

What is claimed is:

1. A glass body containing crystallites of PbS and/or PbSe having a composition essentially free from CdO, which composition consists essentially, expressed in terms of weight percent on the oxide basis except for fluorine, sulfur, and selenium which are expressed in terms of weight percent on the elemental basis, of

| | | | |
|---|---|---|---|
| $SiO_2$ | 58–65 | RO | 0–15 |
| $Na_2O$ | 10–15 | F | 1–3.5 |
| ZnO | 5–17 | S | 0–3 |
| $Al_2O_3$ | 0.5–5 | Se | 0–3 |
| PbO | 3–6 | S + Se | 1–3 | wherein RO consists of at least one alkaline earth metal oxide in the indicated proportions selected from the group consisting of 0–5% BeO, 0–5% MgO, 0–15% CaO, 0–10% SrO, and 0–10% BaO.

2. A glass body according to claim 1 wherein the diameter of said crystallites ranges between about 7–30 nm.

3. A method for making a glass body containing crystallites of PbS and/or PbSe comprising the steps of:
(a) a glass forming batch is melted for a glass essentially free from CdO and consisting essentially, expressed in terms of weight percent on the oxide basis except for fluorine, sulfur, and selenium which are expressed in terms of weight percent on the elemental basis, of

| $SiO_2$ | 58–65 | RO | 0–15 |
|---|---|---|---|
| $Na_2O$ | 10–15 | F | 1–3.5 |
| ZnO | 5–17 | S | 0–3 |
| $Al_2O_3$ | 0.5–5 | Se | 0–3 |
| PbO | 3–6 | S + Se | 1–3 | wherein RO consists of at least one alkaline earth metal oxide in the indicated proportions selected from the group consisting of 0–5% BeO, 0–5% MgO, 0–15% CaO, 0–10% SrO, and 0–10% BaO.
(b) that melt is cooled and simultaneously shaped into a glass body; and
(c) that glass body is heated to a temperature for a time sufficient to develop PbS and/or PbSe crystallites therein.

4. A method according to claim 3 wherein said glass body is heated to a temperature within the range of 525°–650° C. for a time sufficient to develop PbS and/or PbSe crystals therein.

5. A method according to claim 4 wherein said glass body is first heated to a temperature within the range of 450°–550° C. for a time sufficient to develop nuclei therein and thereafter said glass body is heated to a temperature within the range of 525°–650° C. for a time sufficient to develop PbS and/or PbSe crystals therein.

6. A method according to claim 3 wherein the diameter of said crystallites ranges between about 7–30 nm.

* * * * *